May 8, 1923.

W. A. GUNN

COUPLING

Filed Oct. 25, 1922

1,454,587

W. A. Gunn,
Inventor

By C. A. Snow & Co.
Attorney

Patented May 8, 1923.

1,454,587

UNITED STATES PATENT OFFICE.

WALTER A. GUNN, OF LISBON, OHIO, ASSIGNOR TO WRIGHT MANUFACTURING COMPANY, OF LISBON, OHIO.

COUPLING.

Application filed October 25, 1922. Serial No. 596,762.

*To all whom it may concern:*

Be it known that I, WALTER A. GUNN, a citizen of the United States, residing at Lisbon, in the county of Columbiana and State of Ohio, have invented a new and useful Coupling, of which the following is a specification.

This invention relates to couplings of that type generally known as "basket couplings" and especially adapted for connecting the chains and hooks of chain hoists.

One of the objects of the invention is to provide a coupling so shaped as to embrace and project into one link of a chain and to house and provide a bearing for the shank of the hook, the coupling being very strong in construction, constituting an efficient connection between the parts, and permitting, if desired, the use of an anti-friction bearing for the hook.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred forms of the invention have been shown.

In said drawings.

Figure 1:
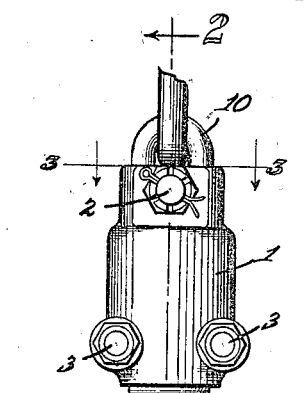
Figure 1 is a side elevation of the coupling in position.
Figure 2:
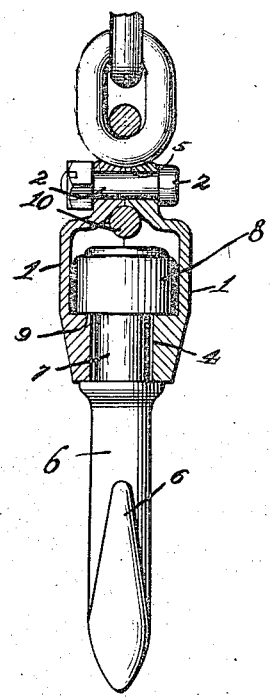
Figure 2 is a section on line 2—2, Figure 1, the hook and a portion of the chain being in elevation.

Referring to the figures by characters of reference 1 designates opposed members of the basket coupling, these members being duplicates and adapted to be held together at the top by a transverse bolt 2 and near the bottom by a pair of transverse bolts 3. The lower portions of the members cooperate to provide an opening 4 while the upper portions of the members are formed with registering grooves 5 cooperating to provide spaced link receiving openings.

The hook 6 has a shank 7 mounted for rotation within the opening 4 and that end of the shank housed within the coupling has a sleeve or enlargement 8 adapted to bear downwardly on interior shoulders 9 located at the inner end of the opening 4. The end link 10 of the chain of a hoist is seated within the registering grooves 5 and as the opposed members 1 come together between these grooves, as well as at points beyond the outer side of the grooves, an efficient connection between the link and the coupling will be provided and the weight of the load will be transmitted through those portions of the members within the link 10, thus relieving the bolt 2 from objectionable transverse strains.

Figure 4:
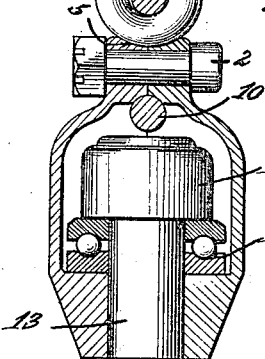
Figure 4 is a view similar to Figure 2 but showing a slightly modified structure.

It will be obvious that by providing a coupling such as described the chain and hook can be connected together securely and the hook will be able to rotate freely relative to the coupling. If desired an antifriction bearing indicated generally at 11 can be arranged within the coupling so as to support the sleeve or enlargement 12 on the hook shank 13. (See Figure 4.)

Importance is attached to the fact that the opposed members of the coupling fit together snugly and when thus secured properly engage the shank and the link. It is also important to provide a coupling which houses the shank and fully protects it. The construction described relieves all of the bolts, wherever located, from excessive strains due to the weight of the load. This weight is taken up entirely by the members of the coupling as long as they are properly held together.

Figure 5:
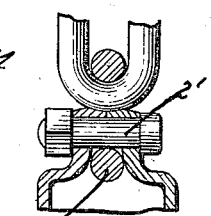
Figure 5 is a section through a portion of a modified structure.
Figure 3:
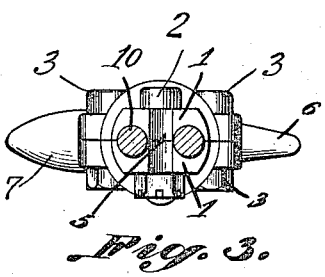
Figure 3 is a section on line 3—3, Figure 1.

Under some conditions it is desirable to eliminate those portions of the members 1 lying between the bolt 2 and the lower portion of the link 10. Such a construction has been shown in Figure 5 and it will be noted that the link 10' thus bears against bolt 2' and said bolt supports the entire load.

What is claimed is:—

In a basket coupling for chain hoists and the like, opposed similar members having registering openings in one end for the reception of a hooked shank and registering openings in the other end for receiving a chain link, means for holding the members together firmly, and means for connecting the members to the chain link comprising a bolt extending through the members and link.

In testimony that I claim the foregoing as my own, I have hereto affixed my signature in the presence of two witnesses.

WALTER A. GUNN.

Witnesses:
C. F. WRIGHT,
H. R. HAM.